United States Patent [19]

Gastineau et al.

[11] 4,155,571
[45] May 22, 1979

[54] SEALING MEMBER AND RETAINER ASSEMBLY FOR SEALING NON-GROOVED JOINTS

[75] Inventors: Robert L. Gastineau; Kenneth L. Michael, both of Dayton, Ohio

[73] Assignee: United Aircraft Products, Inc., Dayton, Ohio

[21] Appl. No.: 690,956

[22] Filed: May 28, 1976

Related U.S. Application Data

[63] Continuation-in-part of Ser. No. 585,614, Jun. 10, 1975, abandoned.

[51] Int. Cl.² ............................................. F16L 23/02
[52] U.S. Cl. ........................................ 285/24; 277/11; 277/180; 285/363; 285/DIG. 11
[58] Field of Search ....................... 277/11, 180, 9, 9.5, 277/236; 285/379, 405, 412, 24, 363, DIG. 11

[56] References Cited

U.S. PATENT DOCUMENTS

| | | | |
|---|---|---|---|
| 2,599,767 | 6/1952 | Long | 277/180 |
| 3,262,722 | 7/1966 | Gastineau et al. | 285/379 |
| 3,531,133 | 9/1970 | Sheesley et al. | 277/180 |
| 3,573,870 | 4/1971 | Gastineau et al. | 277/180 |
| 3,721,452 | 3/1973 | Black | 277/9 |
| 3,874,675 | 4/1975 | Belter et al. | 277/11 |

Primary Examiner—Lenard A. Footland
Attorney, Agent, or Firm—J. E. Beringer

[57] ABSTRACT

A self-locating sealing assembly in which a compressible sealing member and an encircling retainer ring make an assembly for sealing non-grooved joints. The sealing assembly has special application to a standard type pipe flange having a relatively projected sealing surface. The sealing assembly has clip type locating means which make a peripheral engagement with the projected sealing surface concentrically to locate the sealing assembly and to hold it located while the joint is being closed.

9 Claims, 4 Drawing Figures

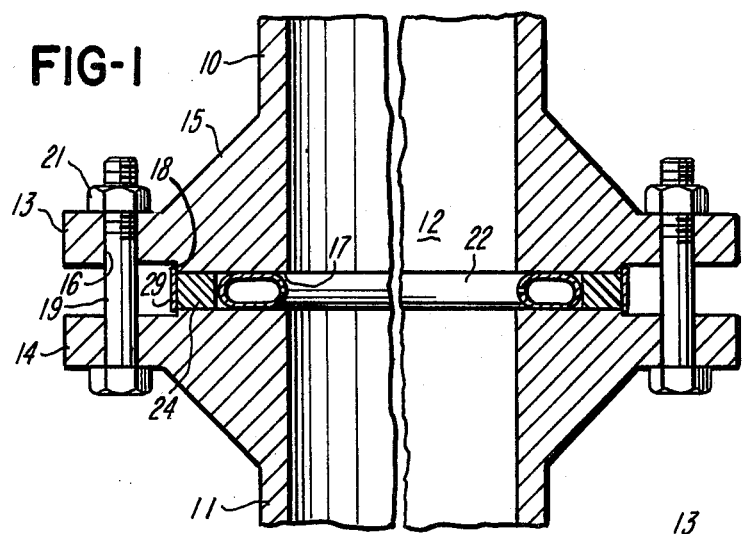
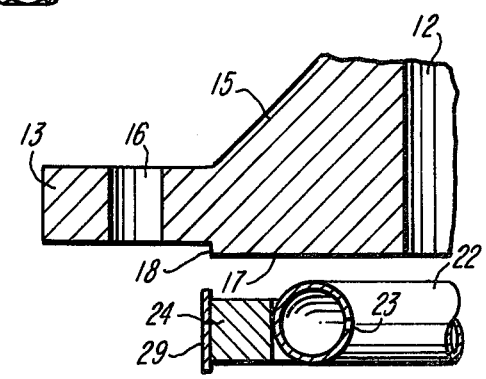
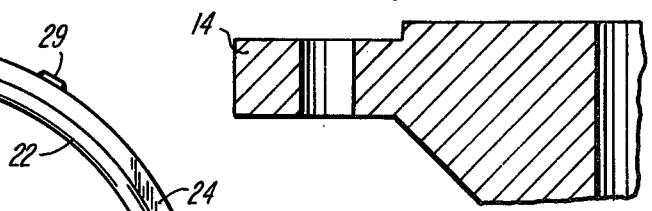
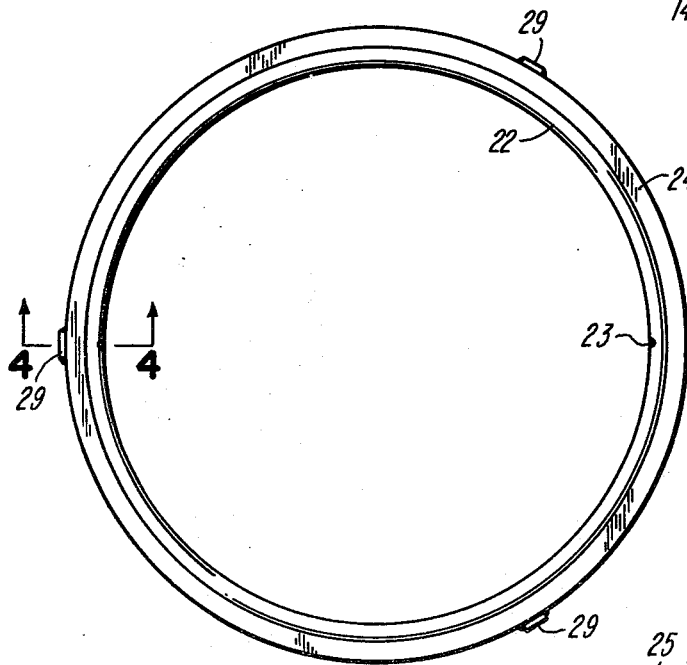
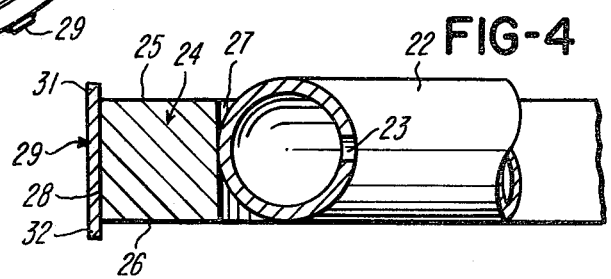

SEALING MEMBER AND RETAINER ASSEMBLY FOR SEALING NON-GROOVED JOINTS

This is a continuation-in-part of prior application Ser. No. 585,614, filed June 10, 1975, now abandoned.

BACKGROUND OF THE INVENTION

Certain details of the construction of pipe flanges are made uniform in the interest of standardization and interchangeability. For example, the American Standards Association and the American Petroleum Institute specify a pipe flange having a raised face, that is a flange face a central reduced diameter portion of which is relatively projected. The raised face, annular in shape, provides a sealing surface and a sealing member, for example an O-ring, is placed between opposed sealing surfaces of mating flanges. Outwardly of the raised sealing surface the flange has a circle of bolt holes. Mating flanges, bolted together, compress an installed O-ring and seal the defined joint. Because installations of this kind lack a groove to receive the O-ring, there are no means to give the O-ring a positive back-up, no means to limit compression of the O-ring and no means properly to locate an installed O-ring and to hold it so located while a joint is being closed. The use of a retainer ring has been suggested and this will serve to provide positive back-up and to limit compression. It does not, however, solve the problem of properly locating or centering the O-ring except that it is possible to make the retainer ring sufficiently broad that its outer periphery will limit against the circle of bolts which surround it. This solution is not an entirely satisfactory one since it does not help in an initial positioning of the O-ring. Also, in each size in the range of sizes to which pipe flanges are made, flanges have a varying breadth and weight according to the pressure of the fluid in flow. This means the circle of bolts will define a different diameter at different fluid pressures and further means that for each expected pressure in a given pipe flange size there must be provided an O-ring retainer of respective predetermined outside diameter. Obvious disadvantages inhere in thus adding to inventory and part selection problems.

Aspects of the problem to which this invention is addressed have been recognized in prior art patents, as for example U.S. Patent to Sheesley et al No. 3,531,133 and U.S. Patent to Black No. 3,721,452. In both instances, however, concept of use of the bolt circle as the positioning means is adhered to. In Sheesley et al it is suggested that the encircling spacer ring could be made separable from the sealing member and replaced with one of different outside diameter corresponding to the diameter of a differently encountered bolt circle. Black makes the same general suggestion but contemplates that the encircling spacer ring be constructed of separable annular parts. Thus a portion of the Black spacer ring can be detached and discarded when it becomes necessary to accommodate to a smaller bolt circle.

SUMMARY OF THE INVENTION

The present invention contemplates a sealing assembly and takes advantage of the fact that, although in a given size pipe flange, the flange characteristics change with pressure, the dimensional features of the sealing surface do not. A sealing assembly according to the invention comprises an O-ring and an encircling retainer therefor. The retainer is constructed to provide a positive back-up for the O-ring and to limit compression thereof. The sealing assembly is structured to be fully contained within annular boundaries of the sealing surface. Opposite faces are adapted for flush intimate contact with the sealing surface and provide for secondary sealing. Clip means mounted on the retainer, as at circumferentially spaced positions on the outer periphery thereof, interengage with the outer periphery of the raised sealing surface. The assembly is accordingly properly aligned with and positioned on the sealing surface, in an initial sense, and is held so positioned while the joint is being closed. A single retainer is applicable to all pipe flanges of a given size irrespective of whether the bolt circle is moved radially inwardly or outwardly. This invention, therefore, abandons the prior art concept of relying on the bolt circle to position the sealing assembly. In so doing it introduces a flexibility and adaptability unknown in the prior art. Problems of stocking multiple diameter spacer or retaining rings, within each flange size, as required in Sheesley et al, are obviated. Similarly, limitations inherent in use of the Black spacer ring are avoided. The retainer lends itself to coating or plating, in conjunction with like surfaces as may be applied to the O-ring. This invention has, in this connection, particular though not limited application to metallic O-rings.

The use of clip means on a retainer has been before known and reference is made in particular to U.S. Patent to Gastineau et al No. 3,262,722. We do not regard the prior Gastineau et al patent as prior art, since it does not deal with and is not concerned with joints between pipe flanges. That this is a separate and independent area of design effort is clearly indicated by the Sheesley and Black patents. These latter patentees must be presumed to have been fully aware of the teachings of Gastineau et al, at the time of making their respective inventions. Neither saw in such teachings, however, anything useful to overcoming problems of changing bolt circle diameter in a pipe flange joint. Moreover, even though Gastineau et al be regarded as suggesting that clip means could be added to the spacer ring of Sheesley et al or of Black this is not to say that a construction and mode of coaction of the parts which is the same as that here taught would necessarily result. The only obvious use of added clip means in Sheesley et al or Black would be to fit such clip means over peripheral edges of the pipe flanges since this is what is taught in Gastineau et al. This would not amount to an anticipation of the present invention. Further, it would be a purposeless modification as far as Sheesley et al and Black are concerned since their sealing assemblies are already centered by contact with the bolt circle. To justify any use of the Gastineau et al teachings in an alleged anticipation of the present invention it is clear that there must simultaneously be present a suggestion that use of the bolt circle to position the sealing assembly is an unnecessary recourse and can be abandoned. Insofar, as is known, the prior art does not contain such a suggestion.

An object of the invention is to provide a sealing member and retainer sealing assembly characterized substantially as in the foregoing.

Other objects and structural details of the invention will appear more clearly from the following description, when read in conjunction with the accompanying drawings, wherein:

FIG. 1 is a fragmentary view in cross section, and partly diagrammatic, of a pipe joint sealed in accordance with a sealing assembly of the present invention;
FIG. 2 is a fragmentary exploded view of pipe flanges and an intermediately positioning sealing assembly;
FIG. 3 is a detail plan view of the sealing assembly; and
FIG. 4 is a fragmentary view in cross section taken substantially along the line 4—4 of FIG. 3 and enlarged with respect thereto.

Referring to the drawings, there is shown in FIG. 1 fragmentary pipe segments 10 and 11 which, in an aligned, connected relation define a through bore 12 for the transport of a gas or liquid under pressure. The pipe segments 10 and 11 have respective flanges 13 and 14 adapted to achieve a mating relationship with one another, forming a joint to be sealed by a sealing assembly in accordance with the present invention. Only one of the flanges 13 and 14 will be described, since they are identical. Thus, adjacent the flange 13, pipe segment 10 terminates in an expanded portion 15 substantially thickening the pipe segment at its extremity and terminating in turn in a flange 13 occupying a plane substantially perpendicular to the axis of bore 12. In the flange 13 is a circle of bolt holes 16. What may be regarded as the outer face of the pipe segment 10, or more particularly the outer face of flange 13 is in a plane parallel to flange 13 and comprises a projected annular surface 17. In its outside diameter, surface 17 is reduced relatively to the diameter of flange 13 and forms a relatively raised surface connected to the flange proper by a circular step or shoulder 18. Raised surface 17 is flat and smooth and, as will be understood, is adapted to serve as a sealing surface, the outer periphery of which is defined by the shoulder 18 and the inner periphery of which is represented by bore 12. In joining the pipe segments 10 and 11 together, the flanges 13 and 14 are placed in an opposing aligned relation. Bolts 19 are installed in aligning corresponding bolt holes 16. Nuts 21 are turned down upon protruding threaded ends of the bolts 19 and secure the pipe segments in an assembled relation.

In accordance with the illustrated embodiment of the invention, a sealing assembly to be installed between the flanges 13 and 14 comprises a hollow metallic O-ring 22, toroidal in shape and being compressible with capabilities of spring back. The O-ring 22 normally has a substantially circular shape in cross section, as shown in FIGS. 2 and 4, and when compressed has a more nearly oval configuration as shown in FIG. 1. Apertures 23 are in the O-ring 22 and serve a self-energizing function which need not be considered in an understanding of the present invention.

In an encircling relation to the O-ring 22 is a retainer ring 24. The ring 24 is substantially square in cross section, presenting upper and lower seating surfaces 25 and 26 and inner and outer peripheral surfaces 27 and 28. The inside diameter of the ring 24 corresponds approximately to the outside diameter of O-ring 22 and the latter is adapted to have a light press fit within the retainer ring. The arrangement is one in which the O-ring and retainer ring are separately fabricated and then brought to an assembled relation with the O-ring pressed into position within the retainer ring. The arrangement facilitates handling storing and installation of the sealing assembly. The height of the retainer ring, that is, the distance from surface 25 to 26 is somewhat less than the normal outside diameter of the O-ring 22, as indicated in FIGS. 2 and 4. The retainer ring is preferable although not necessarily made of metal, is solid and is relatively incompressible. At circumferentially spaced points on the outer periphery of the retainer ring 24 are clips 29. Each clip 29 is a relatively narrow strip of material, which may conveniently be metal, having a length to exceed the height of the retainer ring. The clips 29 are suitably fastened to the outer periphery of the ring 24, as by welding, and are centered thereon so as to have opposite ends projecting respectively beyond the surfaces 25 and 26. In effect, each clip 29 provides upper and lower projecting fingers 31 and 32. In the illustrated instance, the clips 29 are substantially rigid but they may be constructed to provide some resilience or spring action at the fingers 31 and 32. Projecting fingers 31 and 32 have a length not to exceed the height by which sealing surface 17 is raised by shoulder 18 from flange 13 or flange 14. The surfaces 17 accordingly may approach and make a close intimate contact with retaining ring surfaces 25 and 26 without interference engagement of the clip fingers with a respective flange at the base of a shoulder 18.

The outside diameter of retainer ring 24, exclusive of the clips 29, substantially agrees with the outside diameter of raised surface 17. The width of the annulus comprising retainer 24, plus the width or diameter of O-ring 22 is somewhat less than the width of the annulus defined by surface 17. As a result, the placing of a sealing assembly comprising O-ring 22 and retainer ring 24 into a position of alignment with a flange 13 or a flange 14, finds the sealing assembly fully comprised in or contained by the inside and outside diameters of the surface 17. Further, such placement of the sealing assemblies results in the clip fingers 31 and 32 being placed in an overlapping substantially contacting relation to shoulders 18.

In effecting a sealed joint as shown in FIG. 1, a sealing assembly as shown in FIGS. 3 and 4 is brought to a position of alignment between opposing, unbolted flanges 13 and 14, substantially in the manner shown in FIG. 2. The sealing assembly is applied to a surface 17, as for example to the surface 17 of flange 13, in the course of which movement the fingers 31 on the clips 29 interengage with shoulder 18, making what amounts to a friction fit therewith. The result is automatically to center the sealing assembly upon the flange and properly to position O-ring 22 relative to the sealing surface 17. Further, the arrangement is a detenting one in which the sealing assembly tends to be held in a located, centered position while opposing flanges 13 and 14 are advanced upon one another. Such relative advance of the flanges is initially limited by contact of opposing surfaces 17 with opposite faces of the O-ring 22. Bolts 19 then may be installed and nuts 21 turned down to force the flanges into a more closely approaching relation. In response to such enforced movement, the O-ring 22 is compressed and surfaces 17 are allowed to reach a contacting relation to the seating surfaces 25 and 26 of the retainer ring 24. This effectively halts the relative approaching motion of the flanges, limiting compression of the O-ring 22. The latter continues to contact the surfaces 17 radially inwardly of the retainer ring 24 and has an inherent spring back capability which results in an intimate sealing engagement of opposing portions of the O-ring with the sealing surfaces. The extent of compression of the O-ring is determined by the height of retainer ring 24 which is, of course, predetermined to insure that the O-ring is sufficiently compressed to provide good sealing but is not over compressed in a manner to be destructive of its spring back characteristics. The retainer ring 24 further provides a back-up for the O-ring in obviating its radial deformation under the pressure of fluids in bore 12.

As the sealing surfaces 17 are limited in their relative approaching motion by the opposing surfaces or faces 25 and 26 of the retainer ring the seating and sealing surfaces make a close intimate contact with one another. The seating surfaces 25 and 26 accordingly provide for secondary sealing in a backing or reinforcing relation to the O-ring 22. Being fully contained within the area of the sealing surfaces 17, the retainer ring has a particular capability of secondary sealing and responds uniformly to the compressive forces applied by the mating flanges. The circle of bolts 19 is radially spaced from the sealing assembly and it is immaterial to successful use and operation of the sealing assembly whether or not the bolt circle is moved concentrically inwardly or outwardly. Thus, for a given size of pipe flange a single size of retainer ring 24 will serve throughout the range of structural changes which correspond to differences in the pressure of the piped fluid. As heretofore noted, it is the practice to vary the thickness and size of the flanges 13 and 14 as the pressure of the flowing fluid varies. This is done in steps or stages and for each pressure value corresponding to an increasing step, the flange 13 or 14 is broadened and made heavier. The present invention, since it does not rely upon the bolts to position the sealing assembly, is unaffected by such changes. There is not need to manufacture, to hold in inventory and to supply different size retainer rings 24 for different flange structures within a given size. Effective inward concentric movement of the bolt circle may be accomplished within expected changes in pipe flange configuration without interference contact of installed bolts with the sealing assembly.

The invention has been disclosed with respect to a particular embodiment. Modifications in the invention structure are of course possible and are contemplated. For example it is unnecessary that the clip devices 29 have fingers projecting beyond both seating surfaces of the retainer ring 24. This is a useful construction since the retainer ring can then be applied to a flange 13 or 14 without regard to which side is uppermost. However, the inventive concept is complete in the presence of a finger or fingers projecting relatively to only one of the retainer ring seating surfaces. In this same connection, both opposing flanges 13 and 14 will ordinarily have raised sealing surfaces 18 since such uniformity expedites a pipe line installation. Obviously, however, the invention could function in a joint where only one of the opposing flanges has a raised sealing surface. The invention has been disclosed in an embodiment in which a retaining ring provides mechanical back-up and controlled compression loading to a self-energized metallic O-ring. Since the invention is concerned with locating of a sealing assembly, and not with details of a sealing member comprised in that assembly, it will be evident that the sealing assembly may comprise a form of sealing member other than that here disclosed and may comprise a surrounding ring which functions as a spacing and positioning device for the sealing member, in addition to or in lieu of its function as a retaining ring. In referring to an O-ring herein, therefore, we intend to identify any of the various annular compressible sealing members used in pipe joints in conjunction with a surrounding ring performing a retaining or a positioning function or both.

What is claimed is:

1. A bolted pipe flanged joint including opposing pipe flanges each having a circle of bolt holes therein and having inwardly of said circle of bolt holes an annular sealing surface, the sealing surface on at least one of said flanges being a longitudinally projected raised flat annular sealing surface terminating in a peripheral shoulder defining the outer periphery of said sealing surface, said peripheral shoulder being spaced radially inwardly of said circle of bolt holes, a sealing assembly comprising a sealing member and a ring in encircling confining relation to said sealing member positioning between opposing flanges, said sealing assembly having an outside diameter substantially to agree with the outside diameter of said raised sealing surface, means added peripherally to said assembly making a self-locating interengagement with the peripheral shoulder on said raised sealing surface, and bolt means effecting a relative approaching motion of said flanges compressing said sealing member between said sealing surfaces, said bolt means including bolts installed in said bolt holes and spaced radially outwardly from said sealing assembly.

2. A pipe flanged joint according to claim 1, wherein said encircling ring has flat annular faces to either side thereof to limit a relative approaching motion of said flanges and to have a close intimate contact with respective sealing surfaces thereof.

3. A pipe flanged joint according to claim 2, wherein said sealing member has a normal height to exceed the distance between said annular faces of said encircling ring, the inside diameters of said sealing surfaces being such as to apply said sealing surfaces both to said sealing member and to said annular faces of said encircling ring.

4. A pipe flanged joint according to claim 3, wherein said means added peripherally to said assembly comprises circumferentially spaced clips mounted to the outer periphery of said encircling ring to extend in a sense substantially parallel to the ring axis and in projecting relation to at least one said annular faces thereon.

5. A pipe flanged joint according to claim 4, wherein a portion of each of said clips in projecting relation to an annular face of said encircling ring has a height not to exceed the height of a raised sealing surface on a respective flange.

6. A pipe flanged joint according to claim 2, wherein said encircling ring is circular with an outside diameter to be fully contained within the area opposing sealing surfaces to have a capability of secondary sealing.

7. A pipe flanged joint according to claim 6, wherein the sealing surfaces in said opposing flanges are both comprised of longitudinally projected or raised sealing surfaces, said means added peripherally to said sealing assembly having the form of clips fastened to the outer periphery of said encircling ring and providing fingers projecting relatively to respective annular faces thereof, said fingers being adapted to extend into overlapping substantially contacting relation with opposing peripheral shoulders on respective raised sealing surfaces.

8. A bolted pipe flanged joint, including opposing pipe flanges each having a circle of bolt holes therein and having spaced radially inwardly of said circle of bolt holes an annular sealing surface, the sealing surface on at least one of said flanges being a longitudinally projected raised flat annular sealing surface terminating in a peripheral shoulder defining the outer periphery of said raised sealing surface, a sealing assembly comprising a sealing member and a ring in encircling confining relation to said sealing member positioning between opposing flanges, means on said sealing assembly to make a self-locating interengagement with the peripheral shoulder on said raised sealing surface, said sealing assembly having an outside diameter to terminate short of contact with bolts installed in said circle of bolt holes in a self-locating position of said sealing assembly and to provide for reductions and increases in diameter of the circle of bolt holes without interference contact of installed bolts with said sealing assembly and without alteration in or substitution of parts in said sealing assembly.

9. A bolted pipe flanged joint according to claim 8, said means on said assembly having the form of means projecting perpendicularly of said encircling ring and adapted to extend into overlapping substantially contacting relation with a peripheral shoulder of said raised flat annular sealing surface, said perpendicularly projecting means having a projected height not exceeding the height of said raised sealing surface.

* * * * *